May 16, 1944.  E. C. DITZEN  2,348,885
PRECOAT FILTER
Filed Feb. 15, 1941  3 Sheets-Sheet 1
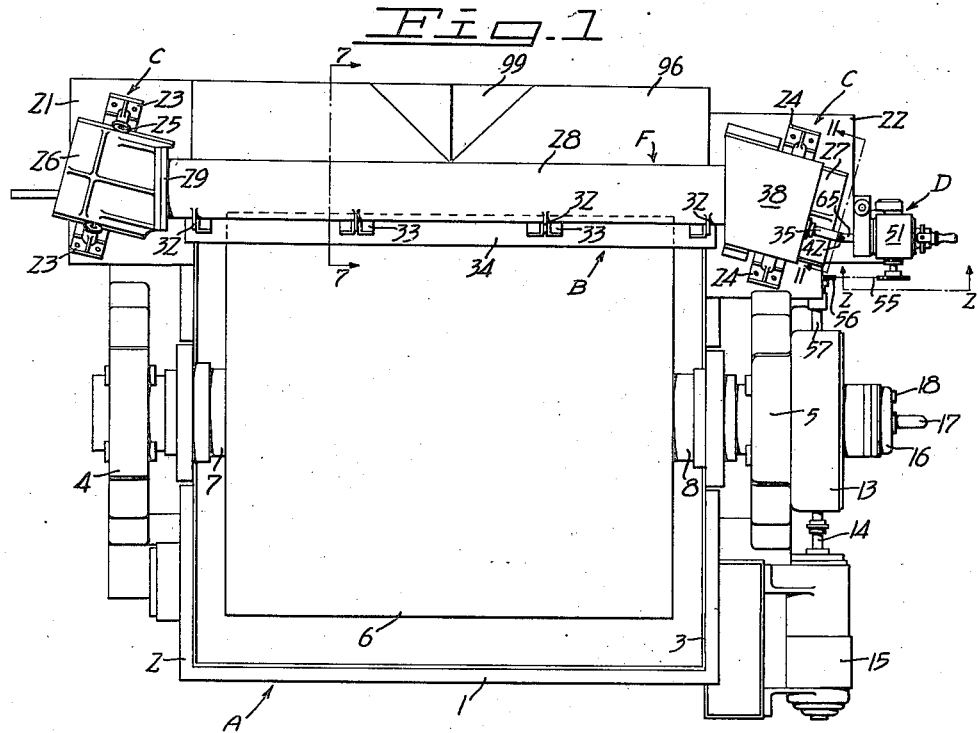
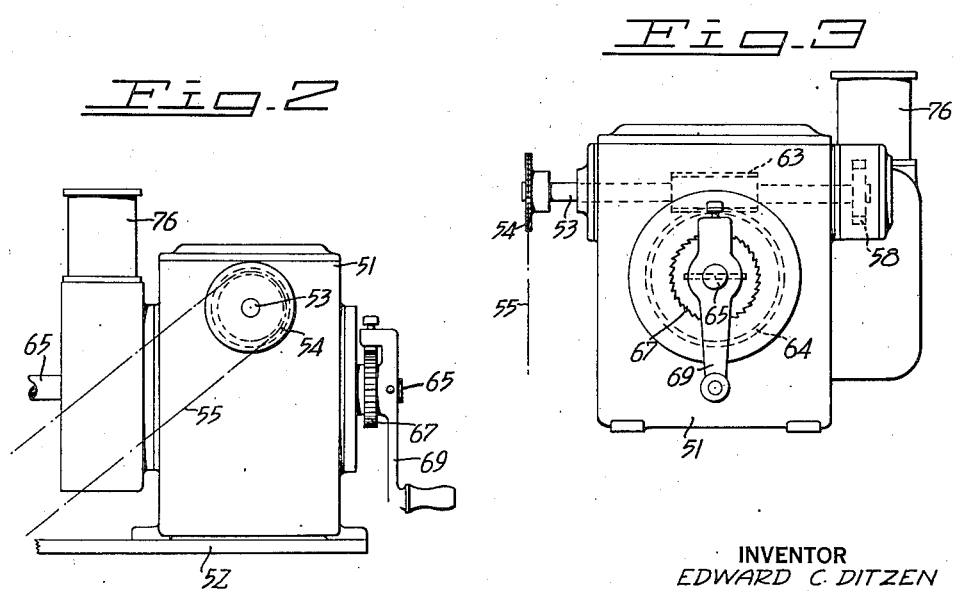
INVENTOR
EDWARD C. DITZEN
BY
ATTORNEY May 16, 1944. E. C. DITZEN 2,348,885
PRECOAT FILTER
Filed Feb. 15, 1941 3 Sheets-Sheet 2
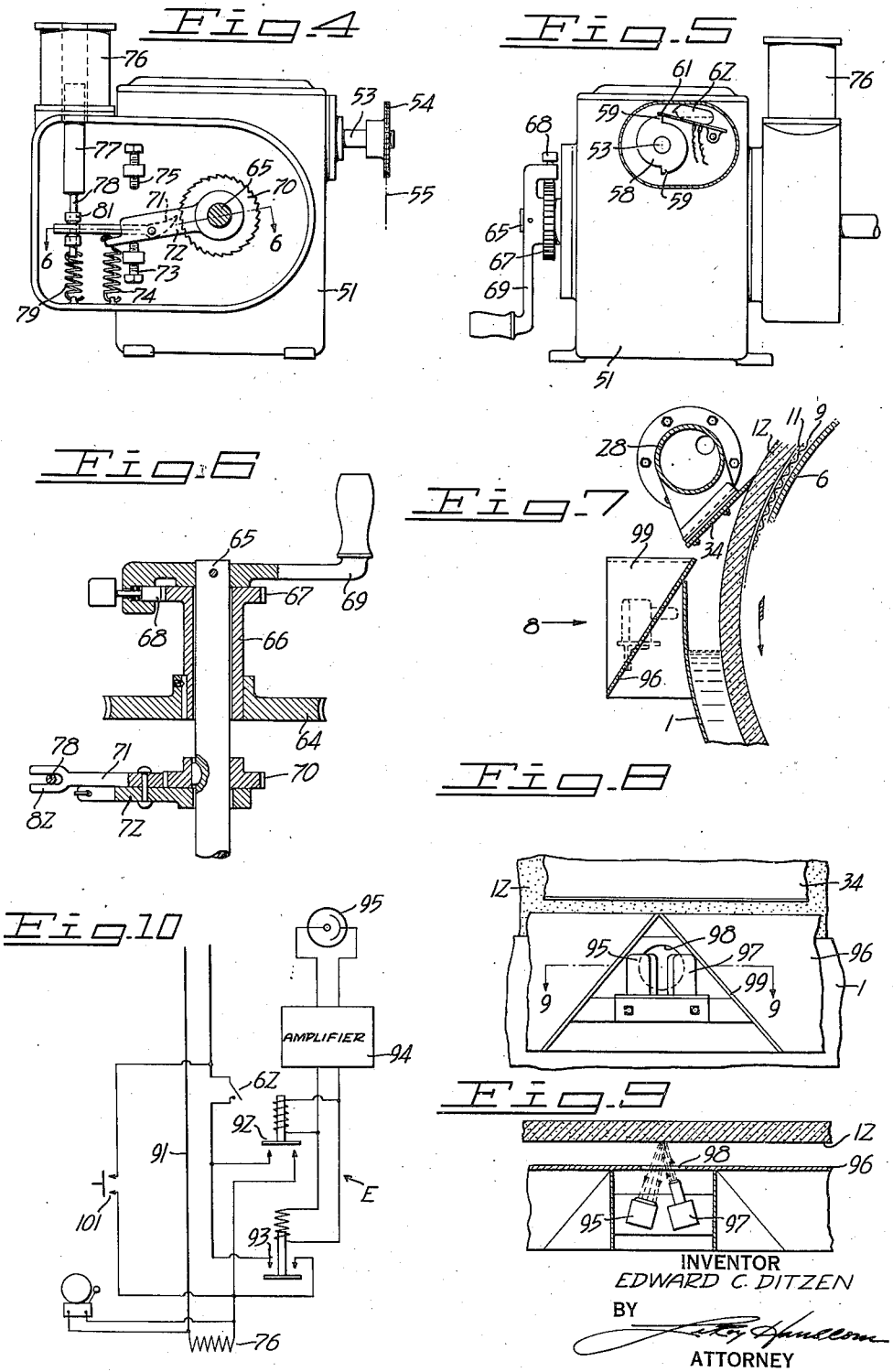
INVENTOR
EDWARD C. DITZEN
BY
ATTORNEY May 16, 1944.　　　　E. C. DITZEN　　　　2,348,885
PRECOAT FILTER
Filed Feb. 15, 1941　　　　3 Sheets-Sheet 3

INVENTOR
EDWARD C. DITZ.
BY
ATTORNEY

Patented May 16, 1944

2,348,885

UNITED STATES PATENT OFFICE 2,348,885

PRECOAT FILTER

Edward C. Ditzen, San Leandro, Calif., assignor to Oliver United Filters Incorporated, Oakland, Calif., a corporation of Nevada Application February 15, 1941, Serial No. 379,079

17 Claims. (Cl. 210—201)

This invention relates in general to filters of the precoat type and particularly to means for advancing the precoat knife in response to variations in the reflecting characteristics of the surface of the precoat.

In the conventional form of precoat filter, a rotary drum is arranged to rotate through a bath or body of the material to be filtered. The peripheral surface of the drum is formed with a substantial layer or precoat of comminuted material such as diatomaceous earth and during the rotation of the drum the cake or layer of solids deposited on the surface of the drum under the action of a differential filtering pressure, is continuously shaved off together with the outer surface of the precoat so as continuously to present a fresh filtering surface to the pulp or slurry to be filtered. Ordinarily this is done by means of a knife extending across the face of the drum and arranged as shown, for example, in my copending application Serial No. 203,854, filed April 23, 1938, now Patent No. 2,243,311, issued May 27, 1941, to slowly and continuously advance into the precoat. Due to the cost of the precoat material and the cost of applying it to the drum, the efficiency or economical operation of a precoat filter requires that only the thinnest possible film of precoat be shaved off during each revolution of the drum, and consequently the knife-advancing mechanism is normally adjusted so as to make a cut in the order of several thousandths of an inch thick.

I have found, however, that in filtering some classes of material, the surface of the precoat becomes clogged or sealed by the deposition of solids formed thereon during one revolution of the drum, and that the differential filtering pressure acting on the clogged or sealed precoat compresses the precoat to such an extent that the advance of the knife is insufficient to effect a cut in the precoat. In other words, when the precoat is effectively blinded or sealed, the differential filtering pressure causes the precoat to recede towards the drum to a greater extent than the normal advance of the knife. Furthermore, during the succeeding revolution of the drum, the precoat becomes more effectively blinded and consequently a further recession of the precoat takes place.

I have observed, however, that the color or reflecting characteristics of a shaved or cut portion of the precoat differs from that of an unshaved or uncut portion, and in general it is the object of this invention to overcome the difficulty above set forth by causing the precoat knife to advance in response to variations in the color or reflecting characteristics of the precoat surface.

More specifically, the object of this invention is the provision in combination with a continuous precoat filter of a photoelectrically controlled precoat knife wherein the photoelectric cell is activated by a beam of light reflected from the precoat surface.

The invention possesses other advantageous features, some of which with the foregoing will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in a plurality of forms.

Referring to the drawings:

Figure 1 is a top plan view of a continuous rotary drum precoat filter embodying the objects of my invention.

Figure 2 is an enlarged detailed rear elevation of the precoat knife driving mechanism as viewed in Figure 1 from the line 2—2.

Figure 3 is an outer end elevation of the drive mechanism shown in Figure 2.

Figure 4 is an inner end elevation of the drive mechanism shown in Figure 2.

Figure 5 is a front elevation of the drive mechanism shown in Figure 2.

Figure 6 is an enlarged detail section taken on the line 6—6 of Figure 4.

Figure 7 is a partial vertical section taken on the line 7—7 of Figure 1.

Figure 8 is a fragmentary front elevation of the filter drum, precoat knife, and photoelectric cell as viewed along the line 8—8 of Figure 7.

Figure 9 is a section taken on the line 9—9 of Figure 8.

Figure 10 is a wiring diagram of the precoat knife control circuit.

Figure 11:
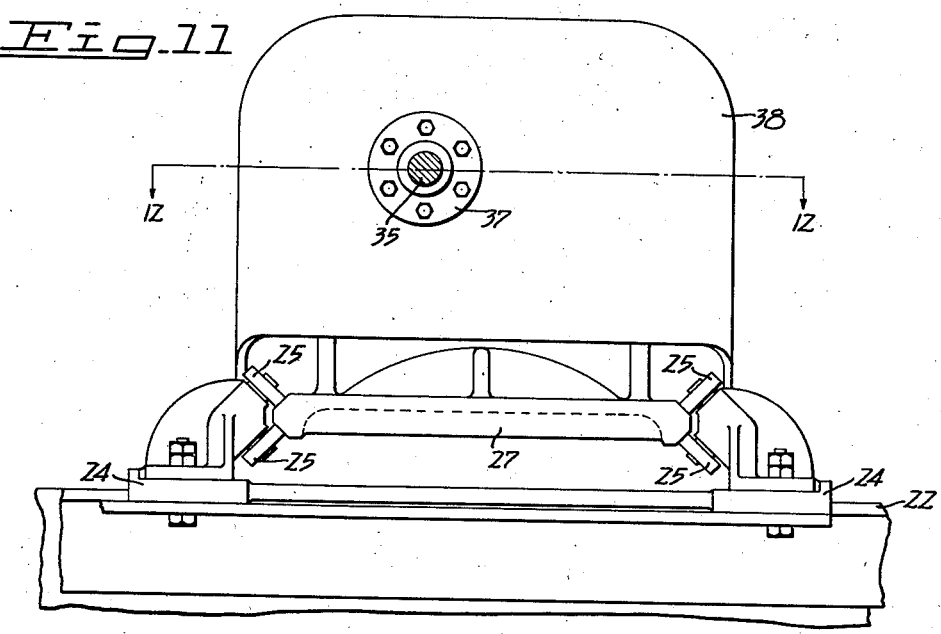
Figure 11 is a fragmentary vertical section of one of the precoat knife mountings taken on the line 11—11 of Figure 1.

For purposes of illustration my invention has been embodied, as shown in Figure 1, in a precoat filter of the continuous rotary drum type and as so illustrated comprises a rotary drum vacuum filter A, a precoat knife B mounted for movement to and from the filter drum on diagonal guide members C, and a drive mechanism D for imparting movement to the knife B. The drive mechanism D is controlled by the electric circuit E shown in Figure 10 and which includes a photoelectric cell activated by a beam of light generated from any suitable light source and reflected from a portion of the precoat surface.

The filter A comprises a pulp or slurry tank 1 formed with heads 2 and 3 which respectively carry bearings 4 and 5. Disposed for rotation within the tank 1 is a filter drum 6 supported at either end by trunnions 7 and 8 respectively journaled in the bearings 4 and 5.

Disposed over the peripheral surface of the drum 6 (see Figure 7) is a spacing member or drainage screen 9, and secured over this spacing member is a filter medium 11 of cloth, woven wire, or the like, on which a precoat 12 of substantial thickness is formed prior to the actual filtering operation. Although for most purposes the entire surface of a continuous precoat filter is maintained under the influence of an inwardly directed differential pressure during actual operation, it is nevertheless advisable in some instances to sectionalize the drum in the conventional manner by the use of division strips, so that the differential pressure on various parts of the drum can be controlled at will. However, regardless of whether the drum is sectionalized or not, the space between the drum 6 and the filter medium 11 serves as a compartment or cell for the reception of the filtrate passing through the precoat and filter medium.

Rotation is imparted to the drum by a ring gear secured to the trunnion 8 within the gear housing 13 and driven through the shaft 14 by a motor 15 carried by the tank head 3.

Associated with the outer end of the trunnion 8 is an automatic valve 16 by means of which the interior of the drum 6 or the filtrate compartment or compartments formed on its peripheral surface may be placed in communication with any suitable source of vacuum through a vacuum connection 17, or vented to atmosphere or placed in communication with a suitable source of air under superatmospheric pressure through a connection 18.

Figure 12:
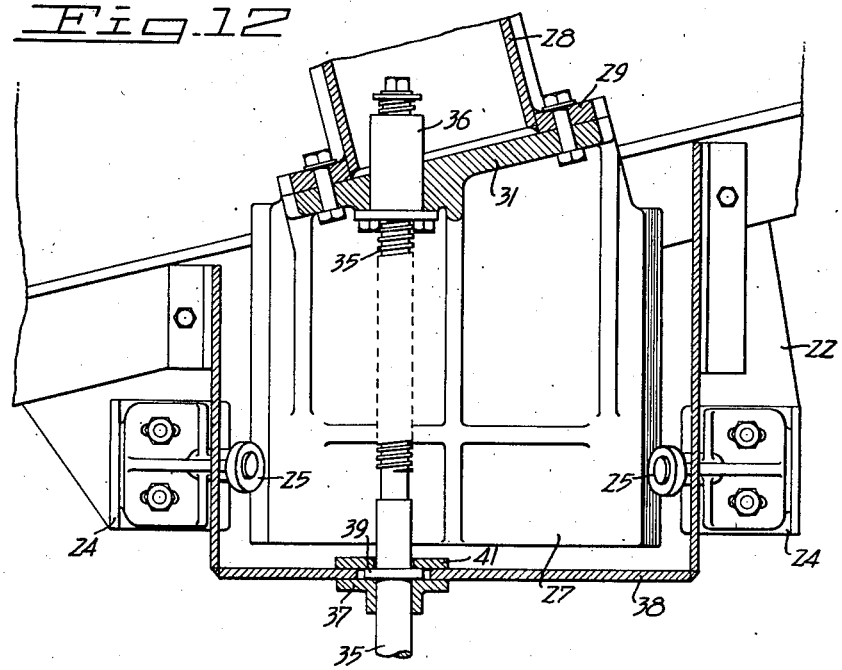
Figure 12 is a horizontal section taken on line 12—12 of Figure 11.

Extending laterally from each of the tank heads 2 and 3 are brackets 21 and 22 on which are mounted guide members 23 and 24 diagonally disposed with respect to the axis of the drum (Figure 1). As best shown in Figures 11 and 12, each of the guide members 23 and 24 is provided with two spaced sets of rollers 25 and arranged to travel on these rollers are the end plates 26 and 27 of a precoat knife carriage F. In addition to the guide members 23 and 24, the carriage includes a tubular beam 28 formed at each end with a flange 29 by which it is bolted to a bracket 31 extending upwardly from the guide members. The beam 28 is provided with a number of spaced lugs 32 and secured to these lugs by clips 33 is the precoat knife 34. The knife 34 as shown in Figure 1 is disposed parallel with the axis of the filter drum but inclined with respect to the drum as shown in Figure 7 at an angle which will readily permit it to cut into the precoat 12.

From this description and from the somewhat more complete description of the continuous precoat filter disclosed in my copending application above referred to, it will be observed that movement of the precoat knife carriage along its diagonally disposed guide members causes the precoat knife to move to or from the filter drum as well as parallel to itself.

Movement of the precoat knife carriage is obtained by means of a drive screw 35 (Figures 1, 11, and 12) having threaded engagement at one end with a sleeve 36 bolted to the bracket 31 and journaled intermediate its ends in a bearing 37 carried by a housing 38 secured to the bracket 22. To prevent longitudinal movement of the screw 35 but at the same time permit it to rotate, a boss 39 formed integral with the screw is locked between the bearing 37 and a ring 41 bolted to the housing 38 and the bearing 37. The screw 35 is in turn driven by the drive mechanism D to which it is connected through a universal connection 42.

The drive mechanism D (Figures 2, 3, 4, and 5) comprises a casing 51 mounted on a bracket 52 extending outwardly from the tank head 3. Journaled in opposed walls of the casing 51 is a shaft 53 to one end of which is secured a sprocket wheel 54 arranged to be driven through a chain 55 by a sprocket wheel 56 carried on the end of a shaft 57. The shaft 57 may be driven by an independent motor but preferably through the filter drum drive by being geared to the gear wheel carried by the trunnion 8 and accommodated within the gear housing 13. Secured to the shaft 53 at its end opposite the sprocket wheel 54 is a cam 58 (Figures 3 and 5) having two high points 59, each arranged to rock a lever 61 pivoted to the casing 51. Mounted on the lever 61 is a mercury switch 62 which is opened and closed twice during each revolution of the shaft 53.

Keyed to the shaft 53 intermediate its ends and within the casing 51 is a worm 63 (Figure 3) in mesh with a gear 64 carried on a shaft 65 journaled in opposed sides of the casing 51 at right angles to the shaft 53. The worm gear 64 as shown in Figure 6 is secured to a sleeve 66 journaled on the shaft 65 and arranged to be locked thereto through a ratchet wheel 67 formed integral with the sleeve 66 and a spring pressed pawl 68 carried by a crank 69. So long, then, as the pawl 68 is in engagement with the ratchet wheel 67, the constant rotation of the shaft 53 will be imparted to the shaft 65.

Keyed to the shaft 65 is a ratchet wheel 70 in alignment with a pawl 71 pivoted intermediate its ends to a lever 72 journaled on the shaft 65. The outer end of the lever 72 is normally maintained against an adjustable screw stop 73 by a spring 74 and its upward travel is limited by an adjustable screw stop 75. Supported on the casing 51 is a solenoid 76 provided with a plunger 77 having a downwardly extending rod 78. A spring 79 secured at its lower end to the casing 51 and at its upper end to the lower end of the rod 78 serves normally to maintain the plunger 77 in the position as shown in Figure 4. Secured intermediate the ends of the rod 78 are a pair of spaced bosses 81 arranged to retain the forked end 82 of the pawl 71 which straddles the rod 78.

Normally the pawl 71 has clearance with the teeth of its associated ratchet wheel 70, but when the solenoid 76 is energized the left hand end of the pawl 71 as viewed in Figure 4 is made to rotate in a clockwise direction about its pivotal point on the lever 72 by the upward movement of the bosses 81, and thereby come into contact with the ratchet wheel. Continued upward movement of the left hand end of the pawl causes the pawl and the lever 72 to move upwardly as a unit about the axis of the shaft 65 until the lever 72 engages the stop 75, thereby causing the ratchet wheel 70 to overdrive the shaft 65. In traveling to the upper end of its stroke the pawl moves out of registration with the teeth of the ratchet wheel and is free to return to its normal position under the influence of the springs 74 and 79 as soon as the solenoid ceases to be energized. The solenoid circuit as shown in Figure 10 includes the mercury switch 62 which as shown in Figure 5 is opened and closed by the points 59 twice during each revolution of the constantly rotating shaft 53.

As shown in Figure 10, one end of the coil of the solenoid 76 communicates directly through a lead 91 to a source of electric current, while the other end of the solenoid passes through one or the other of a pair of solenoid relay switches 92 and 93, the coils of which are in closed circuit with an amplifier 94. The input of the amplifier is in circuit with a photoelectric cell 95 mounted as shown in Figures 7, 8, and 9 on an apron 96 carried on the discharge side of the filter tank 1 beneath the precoat knife 28. Mounted adjacent the photoelectric cell 95 is a light source 97 so arranged that light emitted from it will pass through an opening 98 in the apron 96 to the precoat and be reflected to the face of the photoelectric cell 95. To prevent discharged cake from obstructing the photoelectric cell or the light source 97, an inverted V-shaped hood 99 is secured to the apron 96 over these two members.

The photoelectric cell and light source are so adjusted that when the precoat knife is making a proper cut, the photoelectric cell will permit a definite flow of current through the amplifier 94 which is sufficient to open the normally closed solenoid switch 92 but insufficient to close the normally open switch 93. Under these conditions, then, the solenoid 76 will be inactive and the precoat knife 34 will advance into the precoat 12 at a constant predetermined rate. When, however, the light reflected to the photoelectric cell is decreased by a change in the character of the precoat surface, the switch 92 will close, thereby completing the circuit of the solenoid 76 and causing an overdrive of the shaft 65 and an advance of the precoat knife superimposed upon its normal advance. If on the other hand there is an increase in the light reflected to the photoelectric cell, the switch 93 will close, thereby completing the circuit of the solenoid 76 and again causing an additional advance in the precoat knife. In other words, the circuit is so adjusted that either an increase or decrease in the light reflected to the photoelectric cell will cause an advance of the precoat knife in addition to its normal advance, until the normal amount of light is again being reflected to the photoelectric cell. The function of the mercury switch 62 is continuously to make and break the circuit of the solenoid 76 so that its plunger 77 will continue to reciprocate up and down as long as the reflecting characteristics of the precoat are abnormal.

For the purpose of advancing the precoat knife electrically and independently of the action of the photoelectric cell, a hand switch 101 is provided which as shown in Figure 10 simply shunts the photoelectric cell and relay switch circuit. If it is desired to advance or retard the precoat knife manually, this may be done by simply disengaging the pawl 68 from the ratchet wheel 67 and turning the crank 69 in either direction as desired.

Although as shown and illustrated, the precoat knife is continuously advanced at a predetermined rate, this obviously is not essential, for by use of the photoelectric circuit and drive mechanism shown the precoat knife may be advanced only intermittently and solely in response to variations in the reflecting characteristics of the precoat surface.

It should be noted that my invention may be applied to any form of precoat filter wherein there is relative movement of a precoat knife over the surface of a filter cell, regardless of the manner in which this relative movement is effected and regardless of the form or type of filter used and the method of obtaining the required differential filtering pressure.

I claim:

1. In a filter of the precoat type: a filter cell and precoat knife arranged for relative movement over each other; power means for effecting relative movement of said filter cell and precoat knife toward each other so as to cause said knife to cut into a precoat carried by said filter cell; and means responsive to variations in the light reflecting characteristics of said precoat for controlling said power means and thereby causing said precoat knife to take a cut from said precoat.

2. In a filter of the precoat type: a filter cell and precoat knife arranged for relative movement over each other; a precoat carried on the surface of said filter cell; power means for causing relative movement of said filter cell and precoat knife toward each other so that upon sufficient relative movement of said filter cell and precoat knife toward each other, said precoat knife will take a cut from said precoat; and means responsive to variations in the light reflecting characteristics of the surface of said precoat for controlling said power means and thereby causing said precoat knife to take a cut from said precoat.

3. In a filter of the precoat type: a filter cell and precoat knife arranged for relative movement over each other; power means for effecting continuous relative movement of said filter cell and precoat knife toward each other so as to cause said knife to cut into a precoat carried by said filter cell; an overdrive associated with said power means; and means responsive to variations in the reflecting characteristics of said precoat for controlling said overdrive and thereby causing said knife to take a cut from said precoat.

4. In a filter of the precoat type: a filter cell and precoat knife arranged for relative movement over each other; power means for effecting continuous relative movement of said filter cell and precoat knife towards each other so as to cause said knife to advance into a precoat carried by said filter cell; an overdrive associated with said power means; a motor for actuating said overdrive; and means responsive to variations in the reflecting characteristics of said precoat for controlling said motor.

5. In a filter of the precoat type: a filter cell and precoat knife arranged for relative movement over each other; a precoat carried by said filter cell; power means for effecting continuous relative movement of said filter cell and precoat knife towards each other so as to cause said knife to cut into said precoat; an overdrive associated with said power means; an electric motor for actuating said overdrive; a photoelectric cell carried by said precoat knife in circuit with said electric motor for controlling the operation thereof; and a source of light carried by said precoat knife for reflecting a beam of light from the surface of said precoat to said photoelectric cell.

6. In a filter of the precoat type: a filter comprising: a filter cell arranged to travel in a closed path and to carry a precoat on its surface; a precoat knife mounted adjacent the path of said cell for movement to and from said path; power means for advancing said knife towards said path so as to cut into said precoat; and means responsive to variations in the light reflecting characteristics of a portion of the surface of said precoat for controlling said power means.

7. In a filter of the precoat type: a filter comprising: a filter cell arranged to travel in a closed path and to carry a precoat on its surface; a precoat knife mounted adjacent the path of said cell for movement to and from said path; power means for continuously advancing said knife toward said path so as to cut into said precoat; an overdrive associated with said power means; a motor for actuating said overdrive; and means responsive to variations in the reflecting characteristics of a portion of the surface of said precoat for controlling said motor.

8. A filter of the precoat type comprising: a filter cell arranged to travel in a closed path and to carry a precoat on its surface; a precoat knife mounted adjacent the path of said cell for movement to and from said path; a screw for advancing said knife to and from said path; a motor for rotating said screw; and means responsive to variations in the light reflecting characteristics of the surface of a precoat carried by said cell for controlling said motor and thereby causing said knife to take a cut from said precoat.

9. A filter of the precoat type comprising: a filter cell arranged to travel in a closed path and to thereby generate a surface of revolution; a precoat supported by said cell; a knife arranged adjacent and parallel to said surface of revolution for movement to and from said surface of revolution; and means responsive to changes in the light reflecting characteristics of the surface of said precoat for controlling the movement of said precoat knife.

10. A filter of the precoat type comprising: a filter cell arranged to travel through a body of material to be filtered; a knife arranged adjacent the locus of said cell for movement to and from said locus with its cutting edge parallel to said cell; power means for moving said knife; and means responsive to variations in the light reflecting characteristics of the surface of a body of precoat material carried by said cell for controlling said power means and thereby causing said knife to take a cut from said precoat.

11. A filter of the precoat type comprising: a filter cell arranged to travel in a closed path and to thereby generate a surface of revolution; a precoat supported by said cell; a knife arranged adjacent and parallel to said surface of revolution for movement to and from said surface of revolution; power means for actuating said knife; and means responsive to variations in the light-reflecting characteristics of said precoat for controlling said power means and thereby causing said precoat knife to take a cut from said precoat.

12. A filter of the precoat type comprising: a tank; a filter drum arranged to rotate in said tank; a knife carried by said tank adjacent and parallel to said drum; power means for advancing said knife toward said drum; and means responsive to variations in the light reflecting characteristics of a precoat carried by said drum for controlling said power means and thereby causing said knife to take a cut from said precoat.

13. A filter of the precoat type comprising: a tank; a filter drum arranged to rotate in said tank; a precoat formed on said drum; a knife carried by said tank adjacent to and in cutting engagement with said precoat; power means for advancing said knife into said precoat; and means responsive to variations in the light reflecting characteristics of said precoat for controlling said power means and thereby causing said knife to take a cut from said precoat.

14. A precoat filter comprising: a tank; a filter drum arranged to rotate in said tank; a knife mounted on said tank across the face of said drum for movement to and from said drum; a motor for advancing said knife step by step towards said drum; and means responsive to variations in the light reflecting characteristics of the surface of a precoat carried on said drum for controlling the operation of said motor and thereby causing said knife to take a cut from said precoat.

15. A filter of the precoat type comprising: a tank; a filter drum arranged to rotate in said tank; a knife movably mounted on said tank across the face of said drum; power means for continuously advancing said knife toward said drum; an overdrive associated with said power means for advancing said knife at a rate greater than its normal rate; and means associated with said overdrive and responsive to variations in the light reflecting characteristics of a precoat carried by said drum for controlling and actuating said overdrive to thereby cause said knife to take a cut from said precoat.

16. A filter of the precoat type comprising: a tank; a filter drum arranged to rotate in said tank; a precoat carried by said drum; a precoat knife mounted on said tank across the face of said drum for movement to and from said drum; power means for continuously advancing said knife towards said drum; an overdrive associated with said power means for advancing said knife at a rate greater than that produced by said power means; an electric motor for actuating said overdrive; a photoelectric cell carried by said precoat knife in circuit with and for controlling said electric motor; and a light source carried by said precoat knife and arranged to reflect a beam of light from the surface of said precoat to said photoelectric cell.

17. A filter of the precoat type comprising: a tank; a filter drum arranged to rotate in said tank; a precoat carried by said drum; a precoat knife mounted on said tank across the face of said drum for movement to and from said drum; power means for continuously advancing said knife towards said drum; an overdrive associated with said power means for advancing said knife at a rate greater than that normally produced by said power means; an electric motor for actuating said overdrive; a relay in circuit with said motor; a photoelectric cell carried by said precoat knife in circuit with and for controlling said relay; and a light source carried by said precoat knife and arranged to reflect a beam of light from the surface of said precoat to said photoelectric cell.

EDWARD C. DITZEN.